No. 677,931. Patented July 9, 1901.
E. BADER.
METALLIC PACKING.
(Application filed Jan. 2, 1901.)
(No Model.)
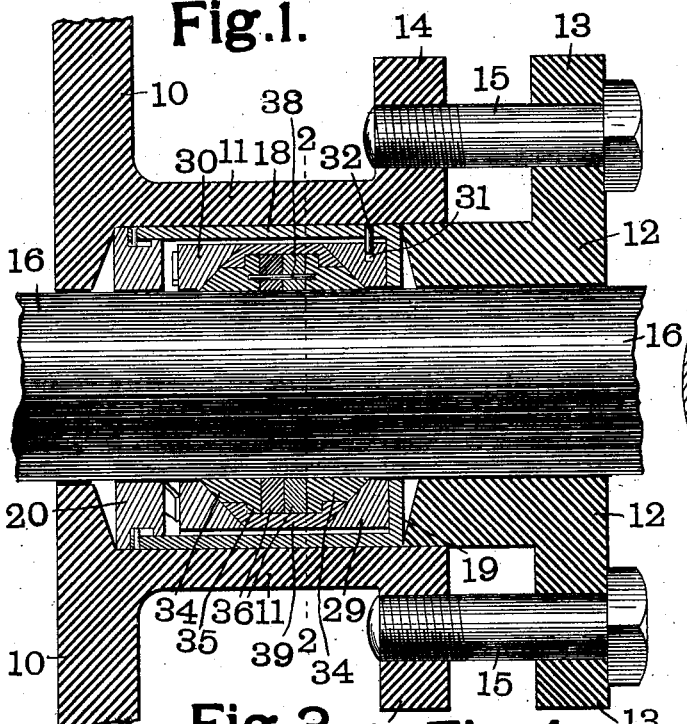
Fig. 1.
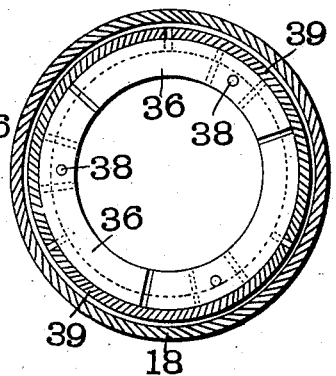
Fig. 2.
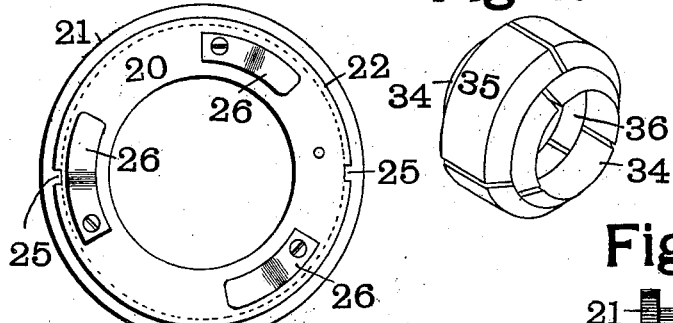
Fig. 3. Fig. 4. Fig. 5.
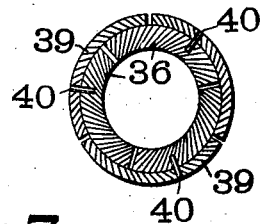
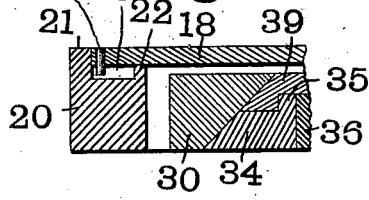
Fig. 6.
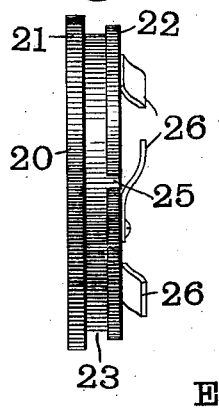
Fig. 7.
Witnesses
W. H. Alexander
Jessie R. Watkins
Inventor
Edward Bader
By Attorneys
Fowler & Bryson

UNITED STATES PATENT OFFICE.

EDWARD BADER, OF ST. LOUIS, MISSOURI, ASSIGNOR OF ONE-HALF TO MEYER BAUMAN, OF SAME PLACE.

METALLIC PACKING.

SPECIFICATION forming part of Letters Patent No. 677,931, dated July 9, 1901.

Application filed January 2, 1901. Serial No. 41,763. (No model.)

*To all whom it may concern:*

Be it known that I, EDWARD BADER, a citizen of the United States, residing at the city of St. Louis, in the State of Missouri, have invented a certain new and useful Metallic Packing, of which the following is such a full, clear, and exact description as will enable any one skilled in the art to which it appertains to make and use the same, reference being had to the accompanying drawings, forming part of this specification.

My packing is especially intended to be used in connection with the piston-rod of an engine; but it may be used for any other similar purpose.

The object of my invention is to provide a metallic packing which can be readily applied to the piston-rod of an engine, which when applied will make and maintain a steam and water tight joint, and which will automatically adjust itself to compensate for any wear.

My invention consists in various novel features and details of construction, all of which are described in the following specification and pointed out in the claims affixed hereto.

In the accompanying drawings, which illustrate one form of packing made in accordance with my invention, Figure 1 is a central longitudinal section through the packing and the stuffing-box and gland of an engine. Fig. 2 is a section on the line 2 2 of Fig. 1, the stuffing-box and piston-rod being omitted. Fig. 3 is an end view of the cover or lid for the casing. Fig. 4 is an isometric projection, on a reduced scale, of a portion of the packing. Fig. 5 is a cross-section of the parts shown in Fig. 4, also on a reduced scale. Fig. 6 is an enlarged detail view, and Fig. 7 is a side view, of the lid or cover shown in Fig. 3.

Like marks of reference refer to similar parts in the several views of the drawings.

10 is a portion of the head of a cylinder of an engine. Formed integral with the head 10 is a stuffing-box 11.

12 is the gland. The gland 12 is provided with lugs 13, and the stuffing-box 11 is provided with lugs 14. Passing through the lugs 13 are bolts 15, which enter threaded openings in the lugs 14.

16 is the piston-rod of the engine.

The above-described parts are of the usual construction and form no part of my invention.

18 is the casing of my packing, which is adapted to fit in the stuffing-box 11. One end 19 of the casing 18 is made solid, except for an opening sufficient to allow the passage of the piston-rod 16. The other end of the casing 18 is open and is adapted to be closed by a lid or cover 20. The lid or cover 20 is provided with two flanges 21 and 22. The flange 21 is larger in diameter than the flange 22 and is adapted to rest against the end of the casing. The flange 22 is adapted to enter the casing. Between the flanges 21 and 22 is a groove 23. The casing 18 is provided with two pins 24, which are adapted to enter the groove 23. The flange 22 is provided with two notches 25 for the passage of the pins 24. Secured to the cover 20 are springs 26, preferably three in number, which are adapted to force the packing-rings into contact with the piston-rod, as will be hereinafter described.

29 and 30 are two collars which are beveled on their inner faces, as shown in Fig. 1. These collars are similar, except that the collar 29 is provided with an opening 31 to receive a pin 32, secured in the casing 18. The springs 26 on the lid 20 bear against the collar 30. Between the collars 29 and 30 are the packing-rings. Two rings 34 are used, each provided with a beveled edge adapted to bear against the beveled face of one of the collars. Each of the rings 34 is provided with a flange 35. Between the rings 34 are two rings 36, whose peripheries are flush with the flanges 35 of the rings 34. Each of the rings 34 and 36 is divided into a number of parts, preferably three, and the joints are arranged so as to be out of register with each other. The joints are maintained in this position by means of pins 38 passing through the rings 36 and into the rings 34. Surrounding the rings 34 and 36 is a ring 39, provided with a groove to receive the flanges 35 of the rings 34 and the outer parts of the rings 36. This ring 39, like the rings 34 and 36, is preferably divided into three parts, as best shown in Fig. 5. The ring 39 is prevented from rotating on the rings 34 and 36 by means of pins 40 passing through said ring 39 into one of the rings 36.

In applying my packing to the piston-rod of an engine the collars 29 and 30 are inserted in the casing 18, with the packing-rings 34, 36, and 39 between them, as shown in Fig. 1. The cover 20 is then inserted in the casing, the pins 24 passing through the slots 25 in the flange 22. The cover is then rotated some distance, so as to prevent the pins passing back through the slots. As the groove between the flanges 21 and 22 is of considerable width, it will allow the cover to move out of the casing until the flange 22 comes in contact with the pins. This will relieve the pressure of the springs 26 on the packing-rings, and hence the packing can be readily applied to the piston-rod, which would not be the case if the pressure of the springs was applied to the rings. As soon as the gland 12 is forced into the stuffing-box the cover 20 will be forced into the casing until the flange 21 comes in contact with the end of the casing. This will cause the springs 26 to bear against the collar 30, thus forcing the packing-rings 34 and 36 into close contact with the piston-rod 16, thus making a steam and water tight joint. At the same time the collar 29 will be forced against the end of the casing 18, so as to make a steam and water tight joint with it. The pin 32 will prevent the collar 29 from being rotated by the movement of the piston-rod, and this will also prevent the rings and the other collar from rotating because of the friction between the said rings and collar.

Having fully described my invention, what I claim as new, and desire to secure by Letters Patent of the United States, is—

1. In a metallic packing, the combination with a casing, of a plurality of expansible packing-rings contained in said casing, a cover adapted to enter said casing and means for locking said cover to said casing so as to allow longitudinal movement between said cover and casing.

2. In a metallic packing, the combination with a casing, of a plurality of expansible rings within said casing, a cover adapted to enter said casing, a groove in the periphery of said cover, and pins in said casing adapted to engage said groove.

3. In a metallic packing, the combination with a casing, of a plurality of expansible rings within said casing, a cover adapted to enter said casing, springs carried by said cover and adapted to act on said packing-rings, and means for locking said cover in said casing so as to allow longitudinal movement between said cover and casing.

4. In a metallic packing, the combination with a pair of expansible packing-rings provided with flanges, of one or more expansible packing-rings situated between said first-named packing-rings and extending flush with said flanges, and an expansible ring surrounding said first-named rings and provided with a groove to receive said flanges and the outer edges of the interposed rings.

5. In a metallic packing, the combination with a casing, of a pair of collars beveled on their opposing faces, a plurality of expansible packing-rings arranged between said collars, means for applying pressure to said collars, and means for non-rotatably securing one of said collars to said casing.

In testimony whereof I have hereunto set my hand and affixed my seal in the presence of the two subscribing witnesses.

EDWARD BADER. [L. S.]

Witnesses:
JAMES H. BRYSON,
JESSIE R. WATKINS.